US012276393B2

(12) United States Patent
Fischer et al.

(10) Patent No.: US 12,276,393 B2
(45) Date of Patent: Apr. 15, 2025

(54) LIGHTING DEVICE FOR A MOTOR VEHICLE

(71) Applicant: Hella GmbH & Co. KGaA, Lippstadt (DE)

(72) Inventors: Bernd Fischer, Altenbeken (DE); Carsten Hohmann, Warstein (DE); Marc Kaup, Paderborn (DE); Martin Mügge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/669,863

(22) Filed: May 21, 2024

(65) Prior Publication Data

US 2024/0392943 A1    Nov. 28, 2024

(30) Foreign Application Priority Data

May 22, 2023   (DE) .......................... 102023113254.7

(51) Int. Cl.
*F21S 43/20*  (2018.01)
*F21S 41/143*  (2018.01)
*F21S 41/151*  (2018.01)
*F21S 41/27*  (2018.01)
*F21S 43/14*  (2018.01)

(52) U.S. Cl.
CPC ....... *F21S 43/26231* (2024.05); *F21S 41/143* (2018.01); *F21S 41/151* (2018.01); *F21S 41/27* (2018.01); *F21S 43/14* (2018.01)

(58) Field of Classification Search
CPC ...... F21S 43/26231; F21S 41/27; F21S 43/14; F21S 41/143; F21S 41/151
See application file for complete search history.

(56) References Cited

U.S. PATENT DOCUMENTS

| | | | |
|---|---|---|---|
| 2021/0018159 A1* | 1/2021 | Vredenborg | F21V 5/005 |
| 2021/0231280 A1* | 7/2021 | Schreiber | F21S 41/47 |
| 2022/0299182 A1* | 9/2022 | Kemetm?ller | F21S 43/14 |
| 2022/0364702 A1* | 11/2022 | Fischer | F21S 41/151 |
| 2024/0247775 A1* | 7/2024 | Fischer | F21S 41/265 |

FOREIGN PATENT DOCUMENTS

DE    102021122953 B3    12/2022

* cited by examiner

*Primary Examiner* — Christopher E Dunay
(74) *Attorney, Agent, or Firm* — Husch Blackwell LLP

(57) ABSTRACT

A lighting device for a motor vehicle includes numerous light sources and a collimator with numerous collimator lenses. Each collimator lens has an entry surface and an exit surface through which light from the light sources passes successively. Projection optics include a first and second transparent substrates, each with an entry surface and an exit surface. At least one array of cylindrical lenses are on the entry and/or exit surface of the first and second substrates. Light exiting the collimator first passes through the at least one array of cylindrical lenses on the first substrate and then through the at least one array of cylindrical lenses on the second substrate. The projection optics include a first array of cylindrical lenses on the first substrate, the cylinder axes of which extend in a first direction, which is horizontal when the lighting device is installed in a vehicle.

18 Claims, 4 Drawing Sheets

LIGHTING DEVICE FOR A MOTOR VEHICLE

CROSS REFERENCE

This application claims priority to German Application No. 10 2023 113254.7, filed May 22, 2023, the entirety which is hereby incorporated by reference.

FIELD OF THE INVENTION

The present invention relates to a lighting device for a motor vehicle.

BACKGROUND OF THE INVENTION

This type of lighting device is disclosed in DE 10 2021 122 953 B3. The lighting device described therein, in particular a headlamp for a motor vehicle, contains numerous light sources that emit light, a collimator that has numerous collimating lenses, each of which has an entry surface and an exit surface through which the light from the light sources pass, and secondary optics with numerous arrays of cylindrical lenses, in which the light exiting the collimator passes through the arrays of cylindrical lenses, the collimator lenses are in at least two rows, in each of which at least two of the collimating lenses are adjacent to one another in a first direction, and the rows are adjacent to one another in a second direction, preferably at a right angle to the first direction.

Three different lighting functions, a high beam, a near portion of a low beam, and a distant portion of a low beam, can be generated with the three rows disclosed in DE 10 2021 122 953 B3. The near portion of the low beam frequently has numerous hot spots on the exit surface of the lighting device, which are consequently inhomogeneous.

BRIEF SUMMARY OF THE INVENTION

It is desirable to be able to be able to generate at least one other light function with a lighting device, in particular a module of a lighting device, in addition to that of a headlamp, e.g. daylight running lights, and/or turn signals, and/or an autonomous driving indicator. It is also desirable for the this type of lighting device to have the same design for daytime and nighttime operation.

The fundamental problem addressed by the present invention is therefore to create a lighting device of the above type that can generate at least one other lighting function in addition to that of a headlamp, e.g. daytime running lights, in particular in which the design of the light device is comparatively uniform for both daytime and nighttime operation.

In an embodiment, the projection optics include a first array of cylindrical lenses on a first substrate, the cylinder axes of which extend in a first direction, which is horizontal when the lighting device has been installed in a vehicle. These cylindrical lenses are adjacent to cylindrical lenses in a second direction, which is at a right angle to the first direction and thus vertical when the lighting device has been installed in a vehicle. The light passing through the cylindrical lenses with horizontal axes is expanded vertically. The legally required intensities above the light/dark boundary of a low beam light for daytime running lights, for example, can be obtained with this vertical expansion. This vertical expansion also contributes to a more homogenous lighting of the second substrate. This contributes to a uniformity in the design of the lighting device for daytime and nighttime operation, because the exit surface of the second substrate substantially determines the visual appearance of the lighting device.

The projection optics can include a second array of cylindrical lenses on the first substrate, the cylinder axes of which extend along the second direction, which is vertical when the lighting device is installed in a vehicle, in particular when the lighting device is designed such that the light exiting the collimator first passes through the first array of cylindrical lenses, and then through the second array of cylindrical lenses, or first passes through the second array of cylindrical lenses, and then passes through the first array of cylindrical lenses. The light passing through the vertical cylindrical lenses is expanded horizontally. This horizontal expansion also contributes to a more homogenous lighting of the second substrate. This further unifies the design of the lighting device in daytime and nighttime operation.

The spacing between the two substrates in a third direction, which is perpendicular to the first and second directions, can be between 10 mm and 100 mm, in particular between 15 mm and 50 mm, preferably between 20 mm and 30 mm, e.g. approx. 25 mm. This spacing is enough to substantially ensure a homogenous lighting of the entry surface on the second substrate. It is also small enough to allow for a compact design of the lighting device.

The lighting device can be designed to generate at least two different lighting functions, the first of which is to light the near portion of a low beam light, and the second of which is daytime running lights, while another lighting function is a turn signal, and/or an autonomous driving indicator. It is therefore possible to generate up to four lighting functions with a single module. The vertical and horizontal expansion in this case can ensure a substantially homogenous light exit surface for all of these four lighting functions.

The collimator can contain at least three collimator lenses that are adjacent to one another in the first direction, in particular exactly three collimator lenses that are adjacent to one another in the first direction. The brightness and width of the light distribution can be increased by increasing the number of light sources and collimator lenses that are adjacent to one another horizontally. Furthermore, different collimator lenses can be assigned different lighting functions.

According to claim 6, the projection optics include at least one off-center array of refractors on the first substrate, in particular an array of prisms, and the lighting device is designed to redirect the light exiting the collimator from the at least one array of refractors toward the middle of the second substrate. In particular, the projection optics can include two arrays of refractors on the first substrate, on opposite sides of the first or second array of cylindrical lenses. As a result of the at least one array of refractors, there is at most one central hot spot on the entry surface of the second substrate when generating a near portion of a low beam light distribution. This contributes on the whole to a more homogenous lighting of the exit surface of the second substrate.

In front of the entry surface of at least the middle collimator lens, in particular in a trio of collimator lenses, there may be no light source for lighting the near portion of a low beam light, while there is a light source for lighting the near portion of a low beam light in front of the entry surface of at least one of the two outer collimator lenses in the trio. The lighting device can then be designed such that the light from the light source that is in front of a collimator lens strikes the at least one array of light-conducting elements on the first substrate, and is then redirected toward the middle of the second substrate after passing through the collimator.

There can also be a light source for daytime running lights, and/or turn signals, and/or an autonomous driving indicator in front of the entry surface of at least one middle collimator lens, in particular the middle in a trio of collimator lenses, and no light source for daytime running lights, turn signals, or autonomous driving indicators in front of the entry surface of at least one of the outer collimator lenses in a trio. This lighting device can then be designed such that light from the first light source in front of a middle collimator lens passes through the first and second arrays of cylindrical lenses on the first substrate after passing through the collimator, and is expanded vertically by the first array and horizontally by the second array on the entry surface of the second substrate.

With this design, the outer collimator lenses can be used for generating the near portion of a low beam light distribution and the middle collimator lens can be used to generate daytime running lights, and/or turn signals, and/or an autonomous driving indicator. The space in front of the collimator lenses is therefore subdivided by the light sources needed for the different lighting functions.

The cylinder axes of the at least one array of cylindrical lenses on the second substrate extend in the second direction, which is vertical when the lighting device is installed in a vehicle. The cylindrical lenses of the at least one array of cylindrical lenses can be adjacent to one another in the first direction on the second substrate, which is horizontal when the lighting device is installed in a vehicle. This results in a horizontal spreading of the light distribution generated by the lighting device outside the motor vehicle.

The projection optics can include a third array of cylindrical lenses on the entry surface of the second substrate and a fourth array of cylindrical lenses on the exit surface of the second substrate, and the lighting device can be designed such that the light exiting the first substrate first passes through the third array of cylindrical lenses and then through the fourth array of cylindrical lenses. The homogenization and horizontal expansion of the light is further increased by using two arrays of cylindrical lenses with vertical cylinder axes that are in front of one another.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 7 a side view of the part of the lighting device shown in FIG. 1, with the light source for daytime running lights switched on.

DETAILED DESCRIPTION OF THE DRAWINGS

The same reference symbols are used in all of the drawings for identical parts or parts with the same function. A cartesian coordinate system is shown in some figures to indicate spatial orientation.

Figure 1:
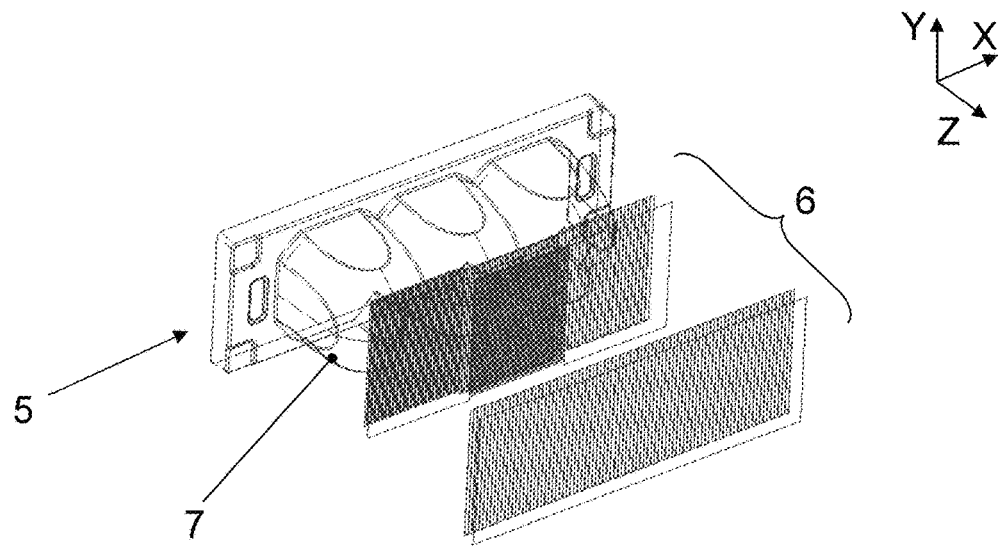
FIG. 1 shows a perspective view of part of an embodiment of a lighting device according to the invention.
Figure 2:
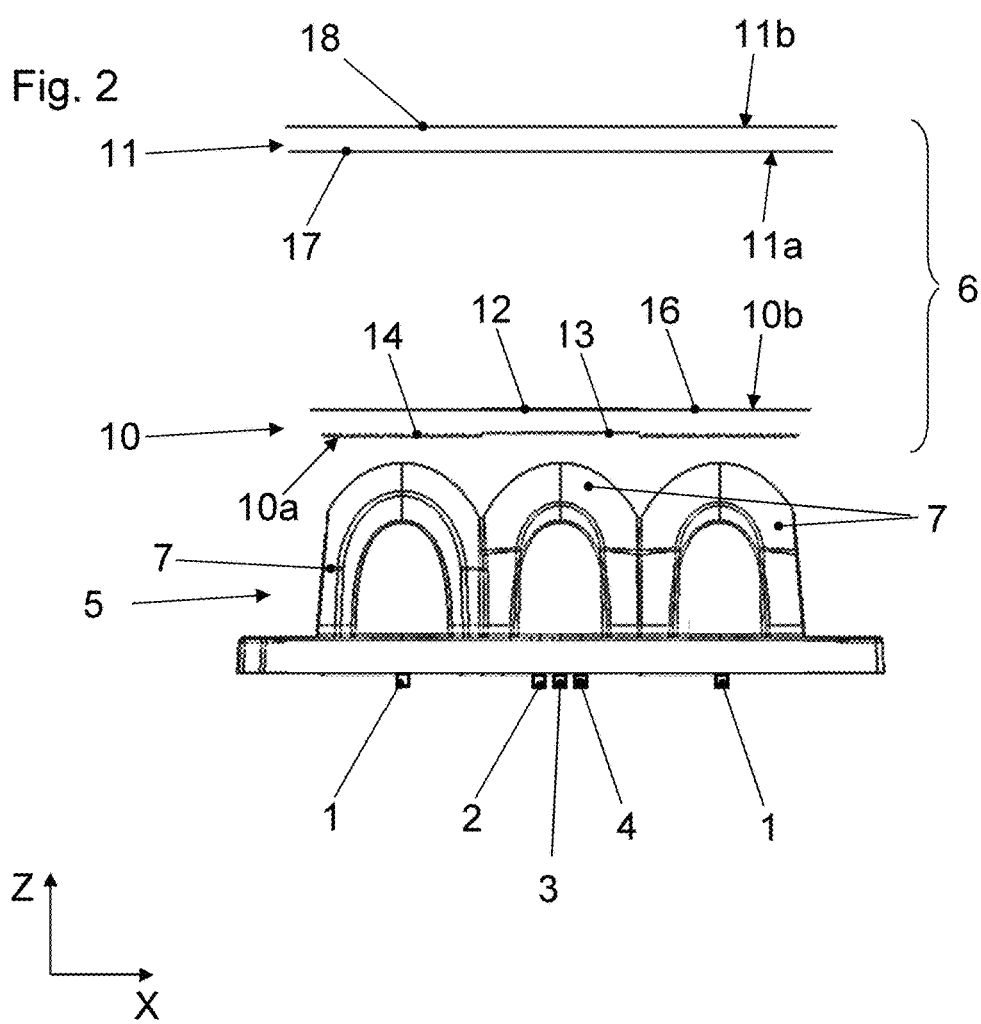
FIG. 2 shows the part of the lighting device shown in FIG. 1 from above.

The embodiment of a lighting device according to the invention in the drawings is a headlamp. The lighting device contains numerous light sources 1, 2, 3, 4 (see FIG. 2), a collimator 5, and secondary optics 6.

The light sources 1, 2, 3, 4 are light-emitting diodes (LEDs) that emit light when the lighting device is on. The light-emitting diodes can be placed on the same printed circuit board. By way of example, the embodiment of the lighting device in the drawings can contain a row of light-emitting diodes that are spaced apart from one another. There can also be more than one row, e.g. two or three rows, of light-emitting diodes that are spaced apart from one another.

The light sources 1, 2, 3, 4 are adjacent and spaced apart along the X-axis in each row. If there are numerous rows, these are adjacent and spaced apart along the Y-axis, which is at a right angle to the X-axis. This results in sufficient spacing between the light-emitting diodes to keep the lighting device from overheating.

The X-axis describes the horizontal plane when the lighting device is installed in a vehicle, and the Y-axis describes the vertical plane.

The collimator 5 is a single, integrally formed part in the drawings, and is designed such that the light from the light sources 1, 2, 3, 4 at least partially passes through the collimator 5. The collimator 5 in the embodiment in the drawings only has one row of collimator lenses 7, which are adjacent to one another along the X-axis.

If there is more than one row of light sources, the collimator 5 also has more than one row of collimator lenses 7. The rows of collimator lenses 7 are adjacent to one another along the Y-axis, or arranged vertically, like the light sources.

There can also be more or less than three collimator lenses 7 in each row.

There is a first light source 1 in front of the outer collimator lenses 7 in the exemplary embodiment shown in the drawings (see FIG. 2), which lights the near portion of a low beam light. Three light sources 2, 3, 4 are placed in front of the middle collimator lenses 7, of which the second light source 2 generates daytime running lights, the third light source 3 generates a turn signal, and the fourth light source 4 generates an autonomous driving indicator.

The second light source 2 emits white light. The third light source 3 emits yellow light. Light source 4 emits cyan light.

There can also be more or less than three light sources in front of the middle collimator lens 7. There can also be more than one light source in front of the outer collimator lenses 7.

Each of the collimator lenses 7 has an entry surface 8 facing the light sources, and an exit surface 9 on the opposite side. Each of the first light sources 1 has a dedicated collimator lens 7 in front of it, such that light from the first light source 1 is substantially collimated by its dedicated collimator lens 7. The second, third, and fourth light sources 2, 3, 4 have the same dedicated collimator lens 7, which is placed in front of the second, third, and fourth light sources 2, 3, 4 such that the light emitted from them is substantially collimated by their dedicated collimator lens 7.

The collimator lenses 7 in the collimator 5 do not have to form an integral component, but instead can be placed on separate substrates, which can be adjacent to one another along the X- and/or Y-axes. The collimator 5 can then be subdivided in columns, lines, or rows in numerous substrates.

Figure 4:
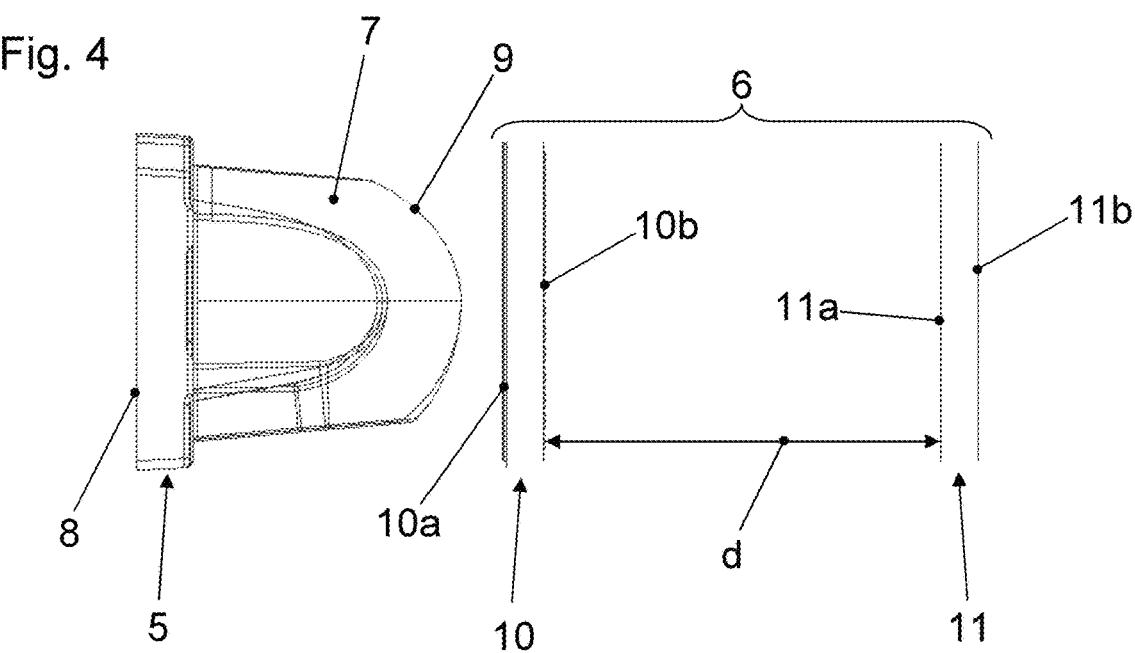
FIG. 4 a side view of the lighting device shown in FIG. 1.
Figure 5:
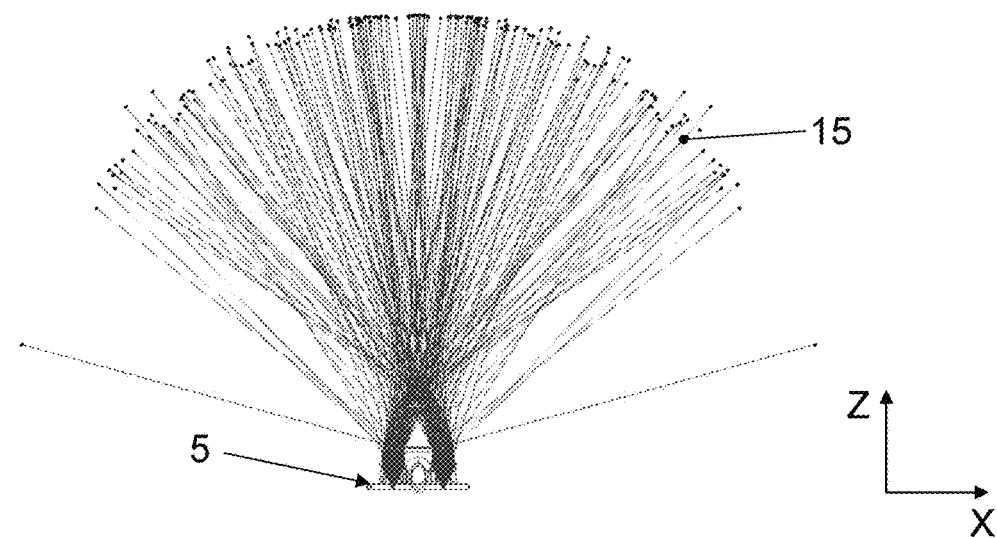
FIG. 5 the part of the lighting device shown in FIG. 1 from above, with the light sources switched on for lighting the near portion of a low beam light.

The secondary optics 6 include two transparent substrates 10, 11 that are spaced apart in the direction of the light emitted from the light sources 1, 2, 3, 4, or along a third, Z-axis, which is perpendicular to the X- and Y-axes (see FIG. 4). The spacing d between the two substrates 10, 11 along the Z-axis is between 10 mm and 100 mm, in particular between 15 mm and 50 mm, preferably between 20 mm and 30 mm, e.g. approx. 25 mm. The secondary optics 6 cause the light exiting the collimator 5 to first pass through the first substrate 10 and then the second substrate 11.

The first substrate 10 has an entry surface 10a facing the collimator 5, and an exit surface 10b on the other side. The second substrate 11 has an entry surface 11a facing the first substrate 10, and an exit surface 11b on the other side.

A first array 12 of cylindrical lenses is placed in the middle of the exit surface 10b of the first substrate 10, the cylinder axes of which extend along the X-axis, i.e. horizontally, when the lighting device is installed in a vehicle. The cylindrical lenses in the first array 12 are adjacent to cylindrical lenses along the Y-axis, i.e. vertically when the lighting device is installed in a vehicle.

Figure 3:
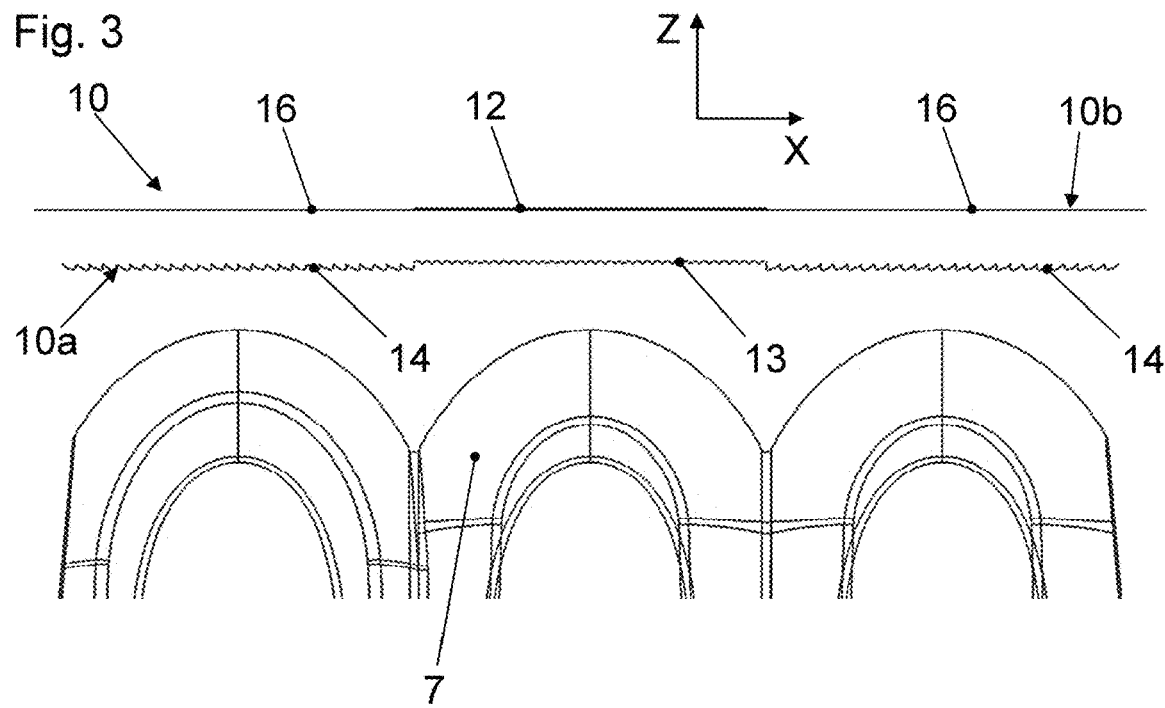
FIG. 3 an enlarged detail of FIG. 2.

There is a second array 13 of cylindrical lenses in the middle of the entry surface 10a of the first substrate 10, lying opposite the first array 12, the cylinder axes of which extend along the Y-axis, i.e. vertically when the lighting device is installed in a vehicle (see FIG. 3). The cylindrical lenses of the second array 13 are vertically adjacent to the cylindrical lenses along the X-axis when the lighting device is installed in a vehicle.

The second array 13 of cylindrical lenses is arranged such that the light exiting the middle collimator lens 7 passes through the second array 13 of cylindrical lenses. The light exiting the middle collimator lens 7 is expanded horizontally by the second array 13 of cylindrical lenses, and vertically by the first array 12 of cylindrical lenses.

The first array 12 of cylindrical lenses can be on the entry surface 10a of the first substrate 10 and the second array 13 of cylindrical lenses can be on the exit surface 10b of the first substrate 10.

Figure 6:
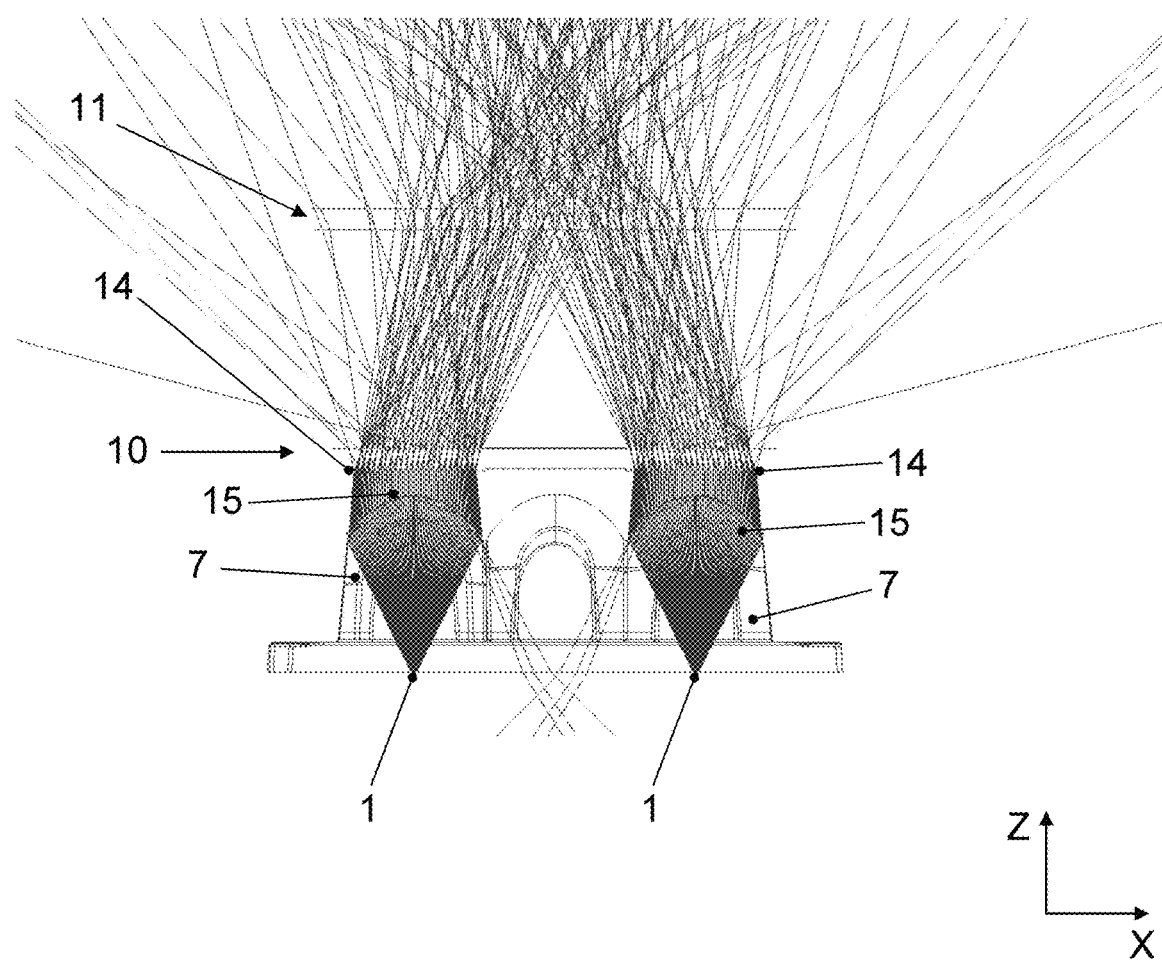
FIG. 6 an enlarged detail of FIG. 5.

There are arrays 14 of refractors on the entry surface 10a of the first substrate 10 to the left and right of the second array 13 of cylindrical lenses. The refractors can be formed by prisms. The lighting device is designed to redirect the light 15 exiting the two outer collimator lenses 7 from the two arrays 14 of refractors toward the middle of the second substrate 11 (see FIG. 6).

The parts 16 of the exit surface 10b of the first substrate lying opposite the arrays 14 of refractors are flat. The flat sections 16 can also be on the entry surface 10a, and the arrays 14 of refractors can be on the exit surface 10b of the first substrate 10. Off-center arrays 14 of refractors can also be placed on the entry surface 10a and the exit surface 10b of the first substrate 10.

There is a third array 17 of cylindrical lenses on the entry surface 11a of the second substrate 11, which extends along the X-axis, in particular over the entire width of the entry surface 11a. There is a fourth array 18 of cylindrical lenses on the exit surface 11b of the second substrate 11, which also extends along the X-axis, in particular over the entire width of the entry surface 11a. The lighting device is thus designed such that the light exiting the first substrate 10 first passes through the third array 17 of cylindrical lenses and then through the fourth array 18 of cylindrical lenses.

The cylinder axes of the third and fourth arrays 17, 18 of cylindrical lenses extend along the Y-axis, i.e. vertically when the lighting device is installed in a vehicle. This results in a horizontal spreading of the light distribution generated outside the vehicle by the lighting device. The cylindrical lenses in the third and fourth arrays 17, 18 are also adjacent to cylindrical lenses along the X-axis, i.e. horizontally when the lighting device is installed in a vehicle.

There can also be an array 17, 18 of cylindrical lenses on just the entry surface 11a or just the exit surface 11b of the second substrate, and the other surface can remain flat.

The cylindrical lenses in the arrays 12, 13, 17, 18 can have a spherical or aspherical cross section. They can also have a cross section corresponding to a segment of a sine function. The cylindrical lenses can also have a polygonal cross section with corners and edges.

In the exemplary embodiment shown in the drawings, the two first light sources 1, the two outer collimator lenses 7, the two arrays 14 of refractors, and the third and fourth arrays 17, 18 of cylindrical lenses are used to generate the near portion of a low beam light distribution.

Figure 7:
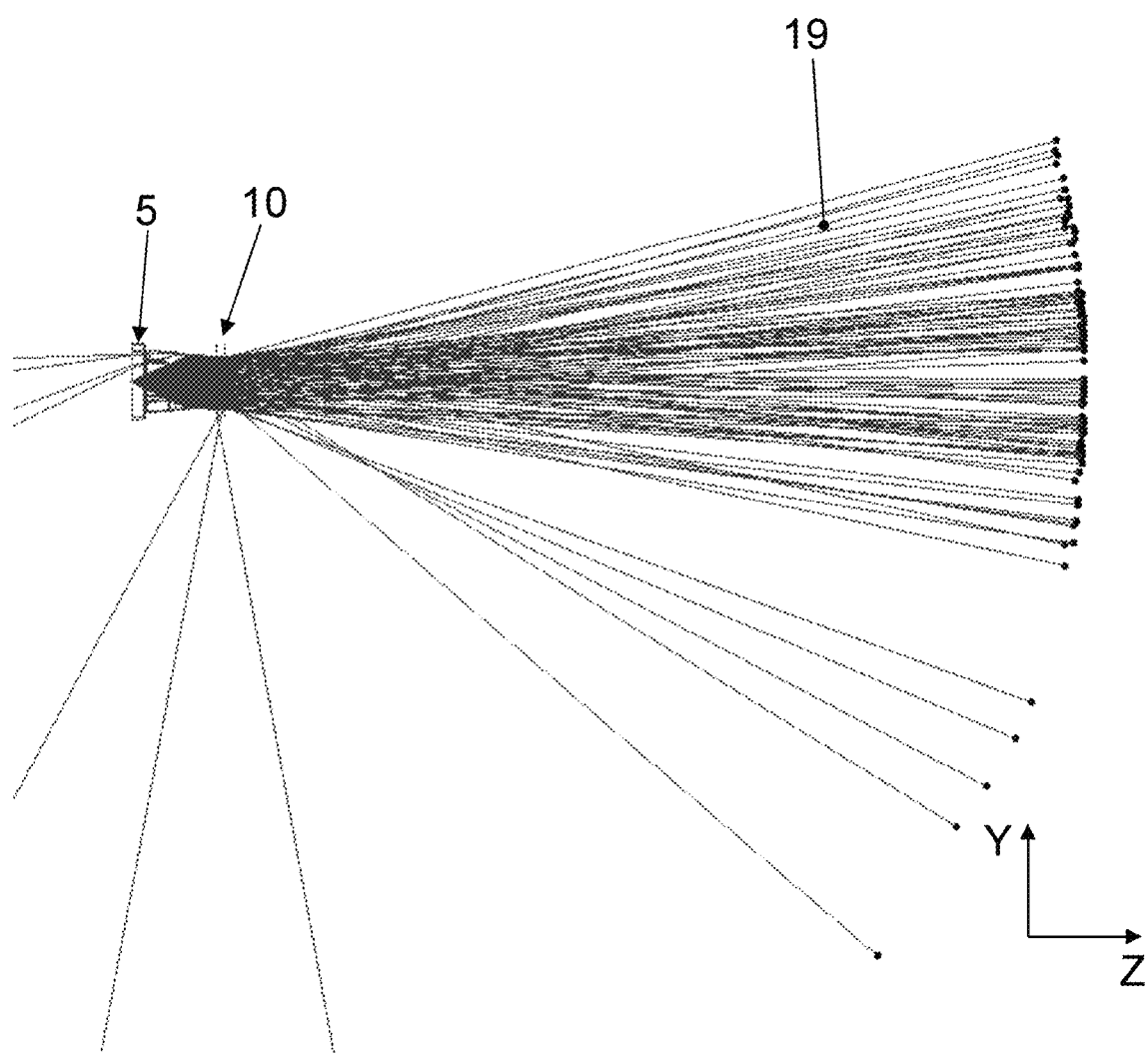

The second light source 2, the middle collimator lens 7, and the first, second, third, and fourth arrays 12, 13, 17, 18 of cylindrical lenses are used to generate daytime running lights. In particular for daytime running lights, the vertical expansion of the light 19 exiting the middle collimator lens 7 by the first array 12 of cylindrical lenses is important with regard to obtaining the legally required intensities of daytime running lights above the light/dark boundary of the low beam light (see FIG. 7).

The third light source 3, middle collimator lens 7, and first, second, third, and fourth arrays 12, 13, 17, 18 of cylindrical lenses are used to generate turn signals.

The fourth light source 4, middle collimator lens 7, and first, second, third, and fourth arrays 12, 13, 17, 18 of cylindrical lenses are used to generate the autonomous driving indicator.

The components used for the individual lighting functions can have different designs. In particular, the collimator lenses 7 used for different lighting functions can have different designs, e.g. different focal lengths or entry and exit surfaces 8, 9 of different shapes.

LIST OF REFERENCE SYMBOLS 1 first light source
2 second light source
3 third light source
4 fourth light source
5 collimator
6 secondary optics
7 collimator lens
8 entry surface of collimator lens
9 exit surface of collimator lens
10 first substrate
10a entry surface of first substrate
10b exit surface of first substrate
11 second substrate
11a entry surface of second substrate
11b exit surface of second substrate
12 first array of cylindrical lenses
13 second array of cylindrical lenses
14 array of refractors
15 light exiting the two outer collimator lenses
16 section of the exit surface of the first substrate lying opposite the array of refractors
17 third array of cylindrical lenses
18 fourth array of cylindrical lenses 19 light exiting the middle collimator lens
d spacing between the two substrates
X first direction
Y second direction
Z third direction

The invention claimed is:

1. A lighting device for a motor vehicle, the lighting device comprising:
   a plurality of light sources that emit light when the lighting device is on;
   a collimator that has a plurality of collimator lenses, each of which has an entry surface and an exit surface through which the light from the light sources passes successively;
   projection optics that includes:
      a first transparent substrate with an entry surface and an exit surface, and
      a second transparent substrate with an entry surface and an exit surface,
      wherein there is at least one array of cylindrical lenses on the entry surface and/or exit surface of the first substrate,
      wherein there is at least one array of cylindrical lenses on the entry surface and/or exit surface of the second substrate,
      wherein light exiting the collimator first passes through the at least one array of cylindrical lenses on the first substrate and then through the at least one array of cylindrical lenses on the second substrate; and
   wherein the projection optics include a first array of cylindrical lenses on the first substrate, a cylinder axes of which extends in a first direction (X-axis), which is horizontal when the lighting device is installed in a vehicle.

2. The lighting device according to claim 1, wherein the cylindrical lenses in the first array are adjacent to one another along a second direction (Y-axis), which is at a right angle to the first direction (X-axis), and is vertical when the lighting device is installed in a vehicle.

3. The lighting device according to claim 2, wherein spacing between the two substrates in a third direction (Z-axis), which is perpendicular to the first (X-axis) and second (Y-axis) directions, is between 10 mm and 100 mm.

4. The lighting device according to claim 1, wherein the projection optics include a second array of cylindrical lenses on the first substrate, the cylinder axes of which extend in a second direction (Y-axis), which is vertical when the lighting device is installed in a vehicle.

5. The lighting device of claim 4, wherein the light exiting the collimator first passes through the first array of cylindrical lenses and then through the second array of cylindrical lenses, or the light exiting the collimator first passes through the second array of cylindrical lenses and then through the first array of cylindrical lenses.

6. The lighting device according to claim 1, wherein the lighting device generates at least two different lighting functions, wherein the first lighting function is a near portion of a low beam light, and the second function is daytime running lights.

7. The lighting device according to claim 6, wherein another lighting function is turn signals, and/or another lighting function is an autonomous driving indicator.

8. The lighting device according to claim 1, wherein the collimator contains at least three collimator lenses that are adjacent to one another in the first direction (X-axis).

9. The lighting device according to claim 8, wherein there is no light source for lighting a near portion of a low beam light in front of the entry surface of at least a middle collimator lens, and there is a light source for lighting the near portion of a low beam light in front of the entry surface of at least one outer collimator lens.

10. The lighting device according to claim 9, wherein light exiting the light source that is in front of one of the outer collimator lenses strikes the at least one array of light guides on the first substrate after passing through the collimator, and is then redirected toward the middle of the second substrate.

11. The lighting device according to claim 9, wherein the middle collimator lens is the middle of three adjacent collimator lenses, and the at least one outer collimator lens is an outer two of the three adjacent collimator lenses.

12. The lighting device according to claim 8, wherein a light source for daytime running lights, and/or a light source for turn signals, and/or a light source indicating autonomous driving, is in front of the entry surface of at least one middle collimator lens, and there is no light source for daytime running lights, turn signals, or indicating autonomous driving in front of at least one outer collimator lens.

13. The lighting device according to claim 12, wherein light exiting the at least one light source in front of a middle collimator lens passes through the first array of cylindrical lenses and second array of cylindrical lenses on the first substrate after passing through the collimator, wherein the light is expanded vertically by the first array and horizontally by the second array onto the entry surface of the second substrate.

14. The lighting device according to claim 1, wherein the projection optics include at least one off-center array of refractors on the first substrate, wherein the lighting device redirects the light exiting the collimator from the at least one array of refractors toward the middle of the second substrate.

15. The lighting device according to claim 14, wherein the projection optics include two arrays of refractors on the first substrate that are on opposite sides of the first or second array of cylindrical lenses.

16. The lighting device according to claim 1, wherein cylinder axes of the at least one array of cylindrical lenses on the second substrate extend in the second direction (Y-axis), which is vertical when the lighting device is installed in a vehicle.

17. The lighting device according to claim 1, wherein the cylindrical lenses in the at least one array of cylindrical lenses on the second substrate are adjacent to one another in the first direction (X-axis) which is horizontal when the lighting device is installed in a vehicle.

18. The lighting device according to claim 1, wherein the projection optics include a third array of cylindrical lenses on the entry surface of the second substrate, and a fourth array of cylindrical lenses on the exit surface of the second substrate, wherein light exiting the first substrate first passes through the third array of cylindrical lenses and then through the fourth array of cylindrical lenses.

* * * * *